US010904796B2

(12) United States Patent
Yang et al.

(10) Patent No.: US 10,904,796 B2
(45) Date of Patent: Jan. 26, 2021

(54) DEVICE, SYSTEM AND METHOD FOR THROTTLING NETWORK USAGE OF A MOBILE COMMUNICATION DEVICE

(71) Applicant: MOTOROLA SOLUTIONS, INC., Chicago, IL (US)

(72) Inventors: Yunhai Yang, Elgin, IL (US); Daniel J. McDonald, Cary, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 52 days.

(21) Appl. No.: 16/176,807

(22) Filed: Oct. 31, 2018

(65) Prior Publication Data

US 2020/0137631 A1 Apr. 30, 2020

(51) Int. Cl.
*H04W 28/20* (2009.01)
*H04W 28/22* (2009.01)
*H04W 4/10* (2009.01)
*H04L 12/26* (2006.01)
*H04W 76/45* (2018.01)
*H04W 4/08* (2009.01)

(52) U.S. Cl.
CPC .............. *H04W 28/20* (2013.01); *H04L 43/16* (2013.01); *H04W 4/08* (2013.01); *H04W 4/10* (2013.01); *H04W 28/22* (2013.01); *H04W 76/45* (2018.02)

(58) Field of Classification Search
CPC ......... H04L 47/10; H04L 47/30; H04L 47/11; H04L 47/12; H04Q 11/0478
USPC ....................................................... 370/229
See application file for complete search history.

(56) References Cited

U.S. PATENT DOCUMENTS

| | | | | |
|---|---|---|---|---|
| 5,867,494 A | * | 2/1999 | Krishnaswamy | ... H04L 12/1485 370/352 |
| 5,867,495 A | * | 2/1999 | Elliott | ................. H04L 12/1485 370/352 |
| 5,999,525 A | * | 12/1999 | Krishnaswamy | ... H04L 12/1818 370/352 |
| 6,404,738 B1 | * | 6/2002 | Reininger | ........... H04L 12/5602 370/236 |
| 6,731,625 B1 | * | 5/2004 | Eastep | .................... H04L 29/06 370/352 |
| 7,100,195 B1 | * | 8/2006 | Underwood | ............ G06F 9/451 726/2 |
| 7,808,918 B2 | * | 10/2010 | Bugenhagen | ........... H04L 47/10 370/242 |
| 8,351,898 B2 | * | 1/2013 | Raleigh | ................... H04L 12/14 455/405 |
| 8,374,081 B2 | * | 2/2013 | Farrugia | ........... H04M 15/8214 370/229 |

(Continued)

*Primary Examiner* — Peter G Solinsky
*Assistant Examiner* — Sanjay K Dewan
(74) *Attorney, Agent, or Firm* — Perry + Currier, Inc.

(57) ABSTRACT

A device, system and method for throttling network usage of a mobile communication device is provided. A mobile communication device comprises: a communication unit configured to wirelessly communicate over a network; a memory storing one or more applications that use the communication unit to communicate via the network; and a controller communicatively coupled to the communication unit and the memory. The controller receives, via the communication unit, network data indicative of current network usage. The controller dynamically throttle usage of the communication unit by the one or more applications according to the network data.

18 Claims, 6 Drawing Sheets

(56) References Cited

U.S. PATENT DOCUMENTS

| | | | | |
|---|---|---|---|---|
| 8,527,627 B2* | 9/2013 | Gerber | | H04L 43/0876 |
| | | | | 709/224 |
| 8,837,279 B2* | 9/2014 | Nemeth | | H04L 47/11 |
| | | | | 370/229 |
| 8,923,117 B2* | 12/2014 | Racz | | H04L 47/14 |
| | | | | 370/229 |
| 9,620,924 B1* | 4/2017 | Creeden | | H01S 3/094003 |
| 2006/0067213 A1* | 3/2006 | Evans | | H04L 47/2416 |
| | | | | 370/229 |
| 2006/0098572 A1* | 5/2006 | Zhang | | H04L 41/5009 |
| | | | | 370/229 |
| 2006/0114825 A1* | 6/2006 | McAuley | | H04L 45/00 |
| | | | | 370/229 |
| 2007/0237074 A1* | 10/2007 | Curry | | H04L 47/29 |
| | | | | 370/229 |
| 2012/0002614 A1 | 1/2012 | Ekici et al. | | |
| 2012/0088470 A1* | 4/2012 | Raleigh | | G06Q 30/0283 |
| | | | | 455/406 |
| 2014/0347983 A1* | 11/2014 | Griot | | H04L 47/263 |
| | | | | 370/230 |
| 2015/0023168 A1* | 1/2015 | Kotecha | | H04W 28/0289 |
| | | | | 370/232 |
| 2015/0036486 A1* | 2/2015 | McMurry | | H04L 47/12 |
| | | | | 370/229 |
| 2015/0043332 A1* | 2/2015 | Nylander | | H04L 43/0829 |
| | | | | 370/229 |
| 2015/0289149 A1* | 10/2015 | Ouyang | | H04W 24/02 |
| | | | | 370/252 |
| 2015/0295808 A1* | 10/2015 | O'Malley | | H04L 47/22 |
| | | | | 709/224 |
| 2016/0373500 A1* | 12/2016 | Li | | H04L 65/604 |
| 2018/0035434 A1* | 2/2018 | Thanayankizil | | H04W 76/10 |

* cited by examiner

DEVICE, SYSTEM AND METHOD FOR THROTTLING NETWORK USAGE OF A MOBILE COMMUNICATION DEVICE

BACKGROUND OF THE INVENTION

Site channel capacity planning of a mobile communication network is generally done based on network usage during busy time periods, number of devices accessing the network during the busy time periods, and the like. Capacities based on such factors don't leave significant headroom and/or capacity overhead for roaming radios during the busy time periods which can be problematic especially when the mobile communication network is used by first responder and/or emergency personnel communication devices. For example, roaming devices at a site could be associated with different first responder agencies assisting with an incident and/or using adjacent sites. Furthermore, capacities based on such factors can lead to problems when channels within the site experience unplanned failure during the busy time periods. Furthermore, during expansion of a site, addition of new channels may not be at the same pace as addition of new devices in an area serviced by the site. In addition, during relatively inactive time periods, a site may be providing access to the network for a relatively small number of devices, and hence have additional unused capacity.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a mobile communication device comprising: a communication unit configured to wirelessly communicate over a network; a memory storing one or more applications that use the communication unit to communicate via the network; and a controller communicatively coupled to the communication unit and the memory, the controller configured to: receive, via the communication unit, network data indicative of current network usage; and dynamically throttle usage of the communication unit by the one or more applications according to the network data.

Another aspect of the specification provides a method comprising: receiving, via a communication unit of a mobile communication device, network data indicative of current network usage, the communication unit configured to wirelessly communicate over a network; and dynamically throttling, using a controller of the mobile communication device, usage of the communication unit by one or more applications of the mobile communication device according to the network data, the one or more applications stored in a memory of the mobile communication device and configured to use the communication unit to communicate via the network.

Figure 1:
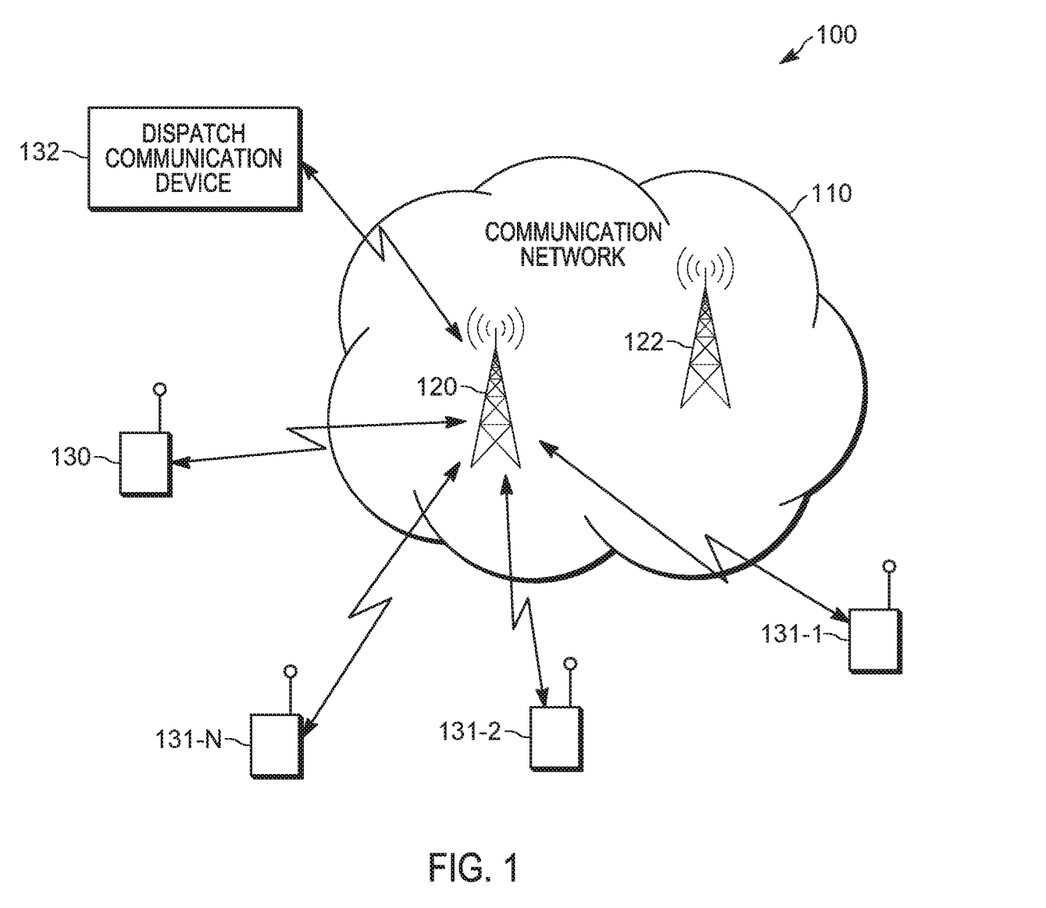
FIG. 1 is a communication system in accordance with some examples.

FIG. 1 illustrates a wireless communication system 100 that includes infrastructure that make up a communication network 110 (interchangeably referred to hereafter as the network 110). There may be many distributed elements in the network 110, some local to each other and others disposed geographically distant from each other. Such elements include one or more base stations and/or sites 120, 122 which provide connectivity for mobile communication devices 130, 131-1, 131-2 . . . 131-N disposed within a coverage area serviced by the sites 120, 122 to other devices either in the same coverage area or in a different coverage area through the network 110. The mobile communication devices 131-1, 131-2 . . . 131-N are interchangeably referred to hereafter, collectively, as the devices 131 and, generically, as a device 131. Similarly, the mobile communication device 130 will be interchangeably referred to hereafter, as the device 130. Furthermore, the devices 130, 131 may be similar to or different from each other.

As depicted, the system 100 further includes a dispatch communication device 132 which is generally enabled to communicate with the devices 130, 131 using radio communications and for which coverage may also be provided by the one or more sites 120, 122; alternatively, the dispatch communication device 132 may be in communication with the sites 120, 122 via one or more wired connections and/or wireless connections (e.g. other than that provided by the sites 120, 122). The dispatch communication device 132 generally provides dispatch communications to the devices 130, 131, for example to assign one or more of the devices 130, 131 a role, a priority and/or to an incident, and the like.

The devices 130, 131 are further understood by persons of skill in the art to communicate in voice calls, for example in a talkgroup on a voice channel and the like, including, but not limited to, video calls and/or exchanging messages, text messages, multimedia messages, and the like. Talkgroups, voice channels video calls and messaging are well known to one of skill in the art and thus will not be described in detail.

Furthermore, communications on voice calls, and the like, may occur using push-to-talk (PTT) protocols, which are also well known to one of skill in the art and thus will not be described in detail.

Hereafter, while reference may be made to functionality and/or processes may be described with reference to a device 130, 131, it is understood by persons of skill in the art that such functionality and/or processes may also occur at the dispatch communication device 132, unless otherwise indicated.

One or more sites 120, 122 may retransmit the information it receives. The sites 120, 122 each may comprise a plurality of antennas, base stations and/or repeaters, and the like that are capable of receiving and retransmitting voice data and/or messages amongst the devices 130, 131. One of the sites 120, 122 may be local to a particular device 130, 131 (e.g. to service a particular device 130, 131) and act as a slave to another of the sites 120, 122.

As will be described in further detail below, at least one of the sites 120, 122 may transmit network data indicative of current network usage at a respective site to one or more of the devices 130, 131, for example periodically and/or when network usage changes and/or when network usage changes by a given threshold amount, and the like. In particular, at least one of the sites 120, 122 may transmit network data indicative of current network usage at a respective site 120, 122 to one or more of the devices 130, 131 that are currently using the respective site 120, 122 to communicate using the network 110. For example, one or more of the devices 130, 131 may include one or more applications that use a respective communication unit to communicate via the network 110, and the current network usage of a site 120 may be due to a plurality of applications at a plurality of the devices 130, 131 using a site 120 to communicate via the network 110. A device 130, 131 receiving the network data indicative of current network usage may dynamically throttle usage of a respective communication unit by one or more respective according to the network data, as described in detail below. Furthermore, a device 130, 131 may override such throttling and/or a device 130, 131 may further dynamically control usage of a respective communication unit based on other factors, including, but not limited to, a role and/or a priority and/or an incident type associated with a device 130, 131.

Each of the devices 130, 131 can be mobile or portable wireless radio units, cellular radio/telephones, or any other type of device capable of wirelessly communicating with the network 110. Examples of devices 130, 131 include cellular telephones, personal digital assistants, or communication devices used by emergency personnel and may be coupled to other devices such as video terminals, portable computers, or the like. However, mobile communication devices not used by emergency personnel are within the scope of the present specification.

The dispatch communication device 132 generally includes one or more dispatch consoles operated by one or more dispatchers, which may communicate with radio devices at the dispatch communication device 132 to communicate with the devices 130, 131 in voice calls, and the like. The dispatch communication device 132 and/or the dispatch consoles, may be configured to transmit data to a device 130, 131 to assign an incident, a role, a priority, and the like to a device 130, 131. Alternatively, roles and/or priority may be preconfigured at a device 130, 131.

While not depicted, the system 100 may include other types of devices, including, but not limited to, infrastructure controllers, or other suitable back-end infrastructure device or combination of back-end infrastructure devices existing "on-premises" (e.g. at a site 120, 122 (e.g. as a site controller and the like), and/or the dispatch communication device 132) and/or in a remote cloud compute cluster accessible to the network 110 and/or the devices 130, 131 via an IP network (such as the Internet). The network 110 may also comprise various other elements not shown in FIG. 1 including, but not limited to, one or more location servers, and the like. The network 110 may be connected to a number of additional content sources, such as the Internet or various Intranets and may comprise multiple interconnected zones, each containing a zone controller, other base stations and/or base sites, data servers, and the like. The network 110 may also be linked to a public switched telephone network (PSTN), and or other type of networks.

Figure 2:
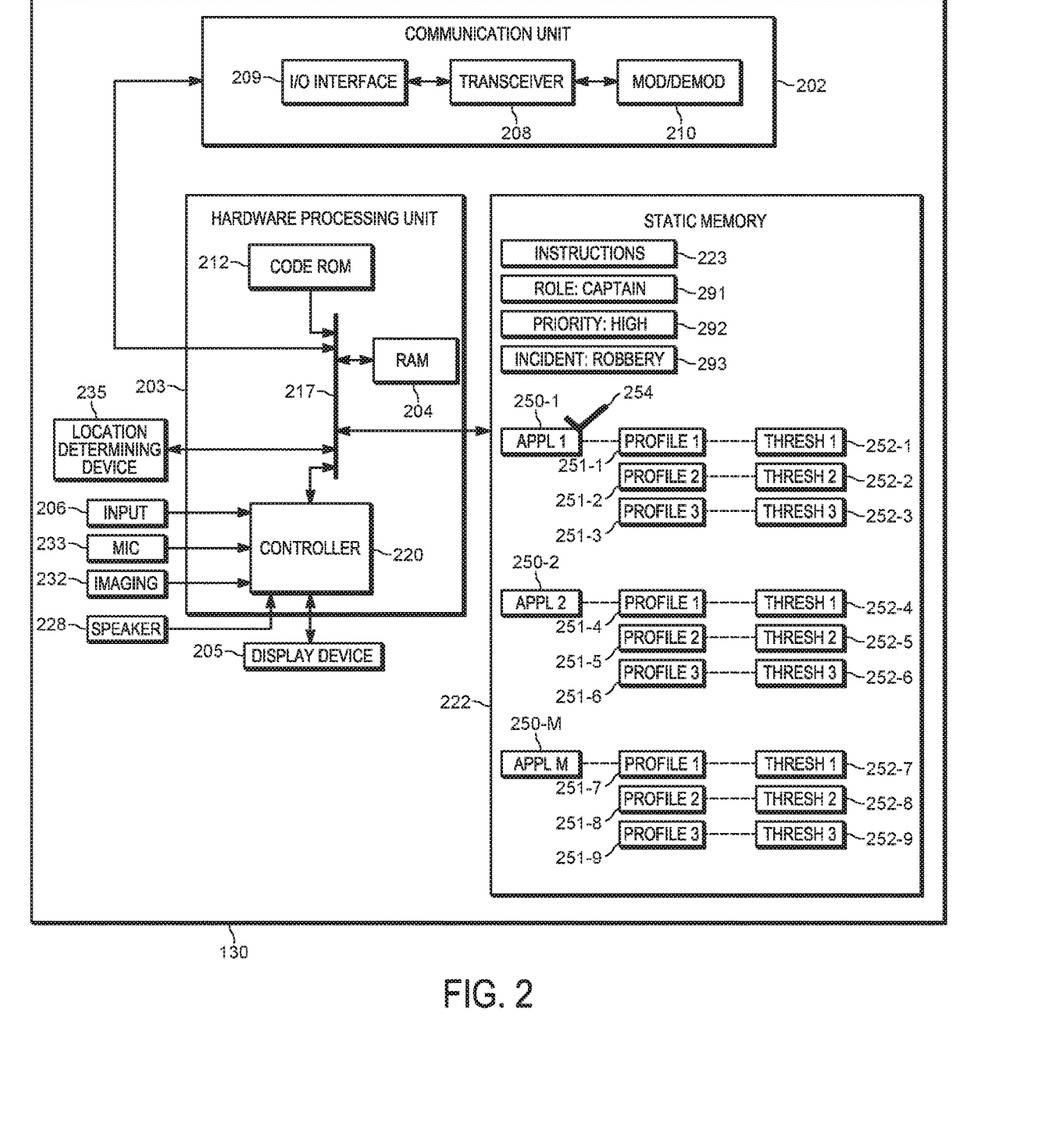
FIG. 2 is a device diagram showing a device structure of a communications device in accordance with some examples.

Attention is next directed to FIG. 2 which sets forth a schematic diagram that illustrates an example device 130. However, the schematic diagram of the example device 130 of FIG. 2 may also describe at least the radio components of any of the devices 131 and/or the dispatch communication device 132. However, any of the devices 131 and the dispatch communication device 132 may include fewer or additional components in configurations different from that illustrated in FIG. 2; regardless the components of FIG. 2 may be adapted for use with the devices 131 and/or the dispatch communication device 132 and/or a dispatch console thereof.

As depicted in FIG. 2, the example device 130 generally includes a communications unit 202, a hardware processing unit 203, a Random-Access Memory (RAM) 204, a display device 205, an input device 206, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing at least one set of instructions 223, a speaker 228, an imaging device 232, a microphone 233 and a location determining device 235.

However, while the device 130 is described with respect to including certain components, it is understood that the device 130 may be configured according to the functionality of a specific device. For example, one or more of the imaging device 232, the microphone 233 and/or other media components associated with the device 130 may be external to the device 130 and communicatively coupled thereto. Similarly, one or more of the components may be optional, such as the location determining device 235.

The example device 130 is described hereafter in further detail. As shown in FIG. 2, the device 130 includes the communications unit 202 coupled to the common data and address bus 217 of the processing unit 203. The device 130 may also include the one or more input devices 206 (e.g., keypad, pointing device, touch-sensitive surface, etc.) and the display device 205 (which, in some examples, may be a touch screen and thus also act as an input device 206), each coupled to be in communication with the processing unit 203.

The speaker 228 and the microphone 233 may be used to communicate via channels and/or talkgroups via the communications unit 202. The imaging device 232 may provide video (still or moving images) of an area in a field of view of the device 130 for further processing by the processing unit 203 and/or for further transmission by the communications unit 202 and which may also be used in communications via channels and/or talkgroups.

The location determining device 235 (e.g. when present) may comprise a global positioning system (GPS) receiver) and the like, generally configured to determine a respective location of the device 130.

While not depicted, the device 130 may include other types of sensors that may acquire sensor data, including, but not limited to, biosensors, accelerometers, and the like.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and the static memory 222.

The communications unit 202 may include one or more wired and/or wireless input/output (I/O) interfaces 209 that are configurable to communicate with the devices 131, the dispatch communication device 132, and/or any other suitable communications devices and/or infrastructure and/or network components, via a site 120, 122.

The communications unit 202 may include one or more wired and/or wireless input/output (I/O) interfaces 209 that are configurable to communicate with other devices 130. For example, as depicted, the communications unit 202 may include one or more wireless transceivers 208 including a long-range wireless transmitter and/or transceiver that has a transmitter transmit range on the order of miles, e.g., 0.5-50 miles, or 3-30 miles (i.e., long-range in comparison to a short-range transmitter such as a Bluetooth™, Zigbee™, or NFC (near field communication) transmitter) with other communication devices and/or network 110, for example using the sites 120, 122. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other examples, the long-range transmitter may implement a Long-Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further examples, the long-range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to the display device 205, the input device 206, the imaging device 232, the speaker 228 and/or the microphone 233, and the like.

The controller 220 may includes one or more logic circuits, one or more processors, one or more microprocessors, one or more digital signal processors, one or more applications processors, one or more ASIC (application-specific integrated circuits) and one or more FPGA (field-programmable gate arrays), and/or another electronic device, adapted for the functionality of the controller 220. Indeed, in some examples, the controller 220 and/or the device 130 is not a generic controller and/or a generic device, but a controller and/or a device specifically configured to implement functionality for dynamically throttling usage of the communication unit 202 by one or more applications of the device 130 according to network data received from a site 120, 122. For example, in some examples, the controller 220 and/or the device 130 specifically comprises a computer executable engine configured to implement functionality for dynamically throttling usage of the communication unit 202 by one or more applications of the device 130 according to network data received from a site 120, 122.

The static memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 130 as described herein are maintained, persistently, at the memory 222 and used by the controller 220 which makes appropriate utilization of volatile storage during the execution of such programming instructions.

In particular, the memory 222 stores instructions 223 that, when executed by the controller 220 to implement functionality for dynamically throttling usage of the communication unit 202 by one or more applications of the device 130 according to network data received from a site 120, 122.

For example, as depicted, the memory 222 further stores a plurality of applications 250-1, 250-2 . . . 250-M (e.g. an "M" number of applications), that are interchangeable referred to hereafter, collectively, as the applications 250 and, generically, as an application 250. While three applications 250 are depicted (e.g. M=3), the number of applications 250 may be as few as one application 250 and as many as tens and/or hundreds of applications 250 and/or any suitable number of applications 250 that may be stored at the device 130. Each of the applications 250 is understood by persons of skill in the art to comprise an application that uses the communication unit 202 to communicate via the network 110; for example, the applications 250 may include, but are not limited to: a text message application (a short message service application, and the like), a location transmission application (e.g. the provides a location of the device 130 to a location server, and the like), a voice data application, a push-to-talk application, a multimedia application (e.g. a multimedia messaging service application, a video chat application, and/or a video and/or audio and/or image transmission and/or reception application), and the like.

As depicted, each application 250 is associated with respective profiles, and each profile is associated with a respective threshold condition. For example, the application 250-1 is associated with application profiles 251-1, 251-2, 251-3, the application 250-2 is associated with application profiles 251-4, 251-5, 251-6, and the application 250-M is associated with application profiles 251-7, 251-9, 251-9. Each of the application profiles 251-1, 251-2, 251-3, 251-4, 251-5, 251-6, 251-7, 251-8, 251-9 are interchangeably referred to hereafter, collectively, as the profiles 251 and, generically, as a profile 251. As depicted, each of the profiles 251 is associated with a respective threshold condition 252-1, 252-2, 252-3, 252-4, 252-5, 252-6, 252-7, 252-8, 252-9 are interchangeably referred to hereafter, collectively, as the threshold conditions 252 and, generically, as a threshold condition 252. Associations between the applications 250, the profiles 251 and the threshold conditions 252, as stored in the memory 222, are indicated in FIG. 2 via dashed lines therebetween.

As depicted, each application 250 is depicted as being associated with three profiles 251 (e.g. "Profile 1", "Profile 2", "Profile 3", which may be the same or different for respective applications 250) and respective threshold conditions (e.g. "Thresh 1", "Thresh 2", "Thresh 3", which may be the same or different for respective applications 250). However, one or more applications 250 may associated with as few as one profile 251 and a respective threshold condition 252, and/or one or more applications 250 may associated with any suitable number of profile 251 and respective threshold conditions 252.

In general, each profile 251 indicates a network usage behavior that is to be applied to a respective application 250 when network data, indicative of current network usage is received from a site 120, 122, meets a respective threshold condition 252, as described in more detail below.

In yet further examples, the applications 250 may not be specifically associated with profiles 251 and threshold conditions 252; rather the memory 222 may store one or more profiles 251 and one or more respective threshold conditions 252, the one or more profiles 251 indicative of a network usage behavior that is to be applied to all the applications 250 when network data, indicative of current network usage is received from a site 120, 122, meets a respective threshold condition 252, as described in more detail below.

Furthermore, in some examples, as depicted one or more the applications 250 may be of a higher priority than others of the applications 250. For example, as depicted, the application 250-1 is stored with an indicator 254 indicating the application 250-1 has a higher priority than the applications 250-2, 250-M.

In specific illustrated examples, when the controller 220 executes the one or more sets of instructions 223, the controller 220 is enabled to: receive, via the communication unit 202, network data indicative of current network usage; and dynamically throttle usage of the communication unit 202 by the one or more applications 250 according to the network data.

The one or more sets of instructions 223 may hence be alternatively referred to as network usage throttling instructions and/or applications. Indeed, different sets of instructions, of the one or more sets of instructions 223, may be used depending on a mode of dynamic throttling. For example, as depicted, the memory 222 further stores: a role 291 associated with the device 130 and/or a user of the device 130 (e.g. the user of the device 130 is a "Captain"); a priority 292 associated with the device 130 and/or a user of the device 130 (e.g. the device 130 and/or the user of the device 130 has a "High" priority); and an incident type 293 (e.g. the device 130 and/or the user of the device 130 has been assigned to respond to a "Robbery"). The role 291 and/or the priority 292 may be provisioned at the memory 222 when the device 130 is assigned and/or provisioned to a user and/or the role 291 and/or the priority 292 may be updated, for example upon receipt of incident data from the dispatch communication device 132. Similarly, the assigned incident type 293 may be received in incident data from the dispatch communication device 132. Regardless, the controller 220 may be further configured to dynamically control usage of the communication unit 202 based on one or more of the role 291, the priority 292, the incident type 293, and/or changes thereto, and/or other factors, as described in more detail below.

Figure 3:
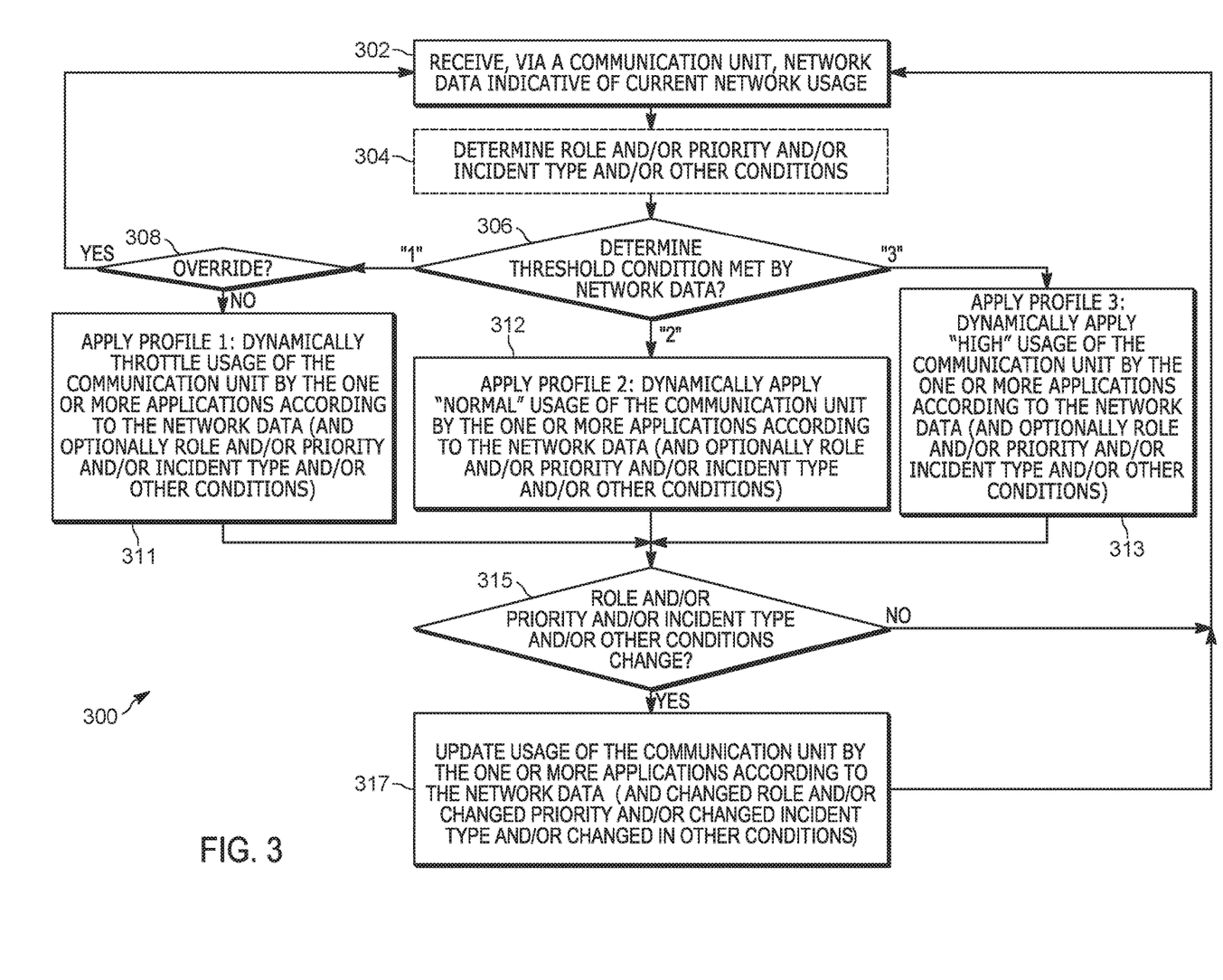
FIG. 3 is a flowchart of a method for throttling network usage of a mobile communication device in accordance with some examples.

Attention is now directed to FIG. 3 which depicts a flowchart representative of a method 300 for dynamically throttling usage of a communication unit by one or more applications of a device according to network data. The operations of the method 300 of FIG. 3 correspond to machine readable instructions that are executed by, for example, a device 130, and specifically the controller 220 of the device 130. In the illustrated example, the instructions represented by the blocks of FIG. 3 are stored at the memory 222 for example, as the instructions 223. The method 300 of FIG. 3 is one way in which the controller 220 and/or the device 130 and/or the system 100 may be configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

Furthermore, while the method 300 is described as being implemented at the device 130, the method 300 may be implemented at one or more of the devices 131.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 receives, via the communication unit 202, network data indicative of current network usage. The network data may be received from a site 120, 122 with which the device 130 is presently using to access the network 110, for example, as depicted in FIG. 1, the site 120.

The network data may include, but is not limited to: a number of active mobile devices (e.g. the devices 130, 131) using a site (e.g. the site 120) with which the communication unit 202 is using to communicate with the network 110; a number of active talkgroups at the site 120; site operation statistics; channel capacity of the site 120; data capacity of the site 120; voice capacity of the site 120; grade-of-service of the site 120; and load indicators of the site 120. For example, each of the sites 120, 122 may be generally configured to determine their current respective network usage and transmit the network data indicative of their current respective network usage to each of the devices 130, 131 that is in communication with the respective site 120, 122, for example as a broadcast message. Such transmission of the network data may occur periodically and/or when the network usage changes by a given amount (e.g. a number of active mobile devices increases or decreases by a given number).

However, while particular examples are provided, the network data received at the block 302 may comprise any suitable indicator of current network usage. For example, a site 120, 122 may be configured to provide an alphanumeric indicator that does not provide details of the current network usage, but may indicate that the current network usage is one of "High", "Normal", "Low" and the like based, for example, on any of the factors of network usage listed above and/or any other suitable indicators of network usage. For example, "High" network usage may indicate that current network usage by a site 120, 122 is high (e.g. above a threshold value associated with high network usage and/or has unused capacity associated with high network usage), "Normal" network usage may indicate that current network usage by a site 120, 122 is normal (e.g. between threshold values associated with normal network usage and/or average network usage and/or has unused capacity associated with normal network usage), and "Low" network usage may indicate that current network usage by a site 120, 122 is low (e.g. below a threshold value associated with low network usage and/or has unused capacity associated with low network usage). However, other indicators are within the scope of the present specification; for example, a site 120, 122 may determine that current network usage is "High" or "Very High", wherein each indicator is associated with respective network usage capacities and the like.

At an optional block 304 (such optionality indicated by the block 304 being depicted in broken lines), the controller 220 may determine one or more of a role, a priority and an incident type, associated with the device 130 and/or any other suitable conditions associated with the device 130 that may affect network usage. Factors determined at the block 304 may include, but are not limited to, one or more of:

A role associated with the mobile communication device 130 (e.g. as stored at the memory 222 as the role 291).

A change in the role associated with the mobile communication device 130 (e.g. the data stored as the role 291 may be updated in conjunction with receiving the network data, and the like, including, but not limited to, receiving such an update of the role 291 from the dispatch communication device 132).

A priority associated with the mobile communication device 130 (e.g. as stored at the memory 222 as the priority 292).

A change in the priority associated with the mobile communication device 130 (e.g. the data stored as the priority 292 may be updated in conjunction with receiving the network data, and the like, including, but not limited to, receiving such an update of the priority 292 from the dispatch communication device 132).

An incident type associated with the mobile communication device 130 (e.g. as stored in the incident type 293 and/or as received from the dispatch communication device 132).

An over-the-air signal quality, as measured using the communication unit 202. For example, a Received Signal Strength Indication (RSSI) may be determined by the controller 220, which may be used to increase or decrease network usage.

A talkgroup (and/or a priority thereof) with which the mobile communication device 130 is currently communicating. For example, some talkgroups may be of higher priority than other talkgroups.

A change in the talkgroup with which the mobile communication device 130 is currently communicating.

A site 120, 122 with which the mobile communication device 130 is currently communicating, which may assist the controller 220 in determining whether the device 130 is roaming or not; when roaming, the device 130 may have lower priority than when not roaming.

At a block 306, the controller 220 determines which of the threshold conditions 252 are met by the network data received at the block 302. Continuing with the example of the network data comprising alphanumeric data indicating that the current network usage is one of "High", "Normal", "Low", the threshold conditions 252 corresponding to "Thresh 1" stored in the memory 222 may comprise "High", the threshold conditions 252 corresponding to "Thresh 2" stored in the memory 222 may comprise "Normal", and the threshold conditions 252 corresponding to "Thresh 3" stored in the memory 222 may comprise "Low".

However, when the network data comprises data and/or raw indicative of any of the factors for network usage listed above and/or any other suitable indicators of network usage, the threshold conditions 252 may be adapted accordingly; for example, the threshold conditions 252 corresponding to "Thresh 1" stored in the memory 222 may comprise one or more threshold conditions associated with high network usage, the threshold conditions 252 corresponding to "Thresh 2" stored in the memory 222 may comprise one or more threshold conditions associated with normal network usage, and the threshold conditions 252 corresponding to "Thresh 3" stored in the memory 222 may comprise one or more threshold conditions associated with low network usage. The threshold conditions 252 may be determined heuristically and/or predetermined and populated at the memory 222, for example when the instructions 223 are populated at the memory 222 (e.g. in a factory environment and/or in an application installation process).

Furthermore, while the method 300 is described with respect to high, normal, low network usage, any suitable type of network usage is within the scope of the present specification (e.g. "Very High" as described in more detail below), and which can be threshold based and/or based on a type of service. For example, voice data, short message service (SMS) data and multimedia data could have different network load rates at a site 120, 122 and throttling of a specific type of application 250 at the device 101 could occur based on a network usage at a site 120, 122 for the specific service (e.g. a voice data application 250 could be throttled based on high voice data network usage, but an SMS application 250 may not be throttled based on normal or low network usage of SMS data network usage). Hence, the network data received at the block 302 could indicate current network usage for different service types, and the profiles 251 and threshold conditions 252 could be different for each of the applications 250 based on corresponding service types.

When the controller 220 determines, at the block 306, that the network data received at the block 302 meets a threshold condition 252 corresponding to "Thresh 1" (e.g. high network usage and/or the network data comprises "High" and/or a "1" decision at the block 306), at a block 308 the controller 220 determines whether an override condition exists at the device 130. For example, such an override condition may be based on one or more of the role 291, the priority 292, the incident type 293, and input received at the input device 206.

Figure 5A:
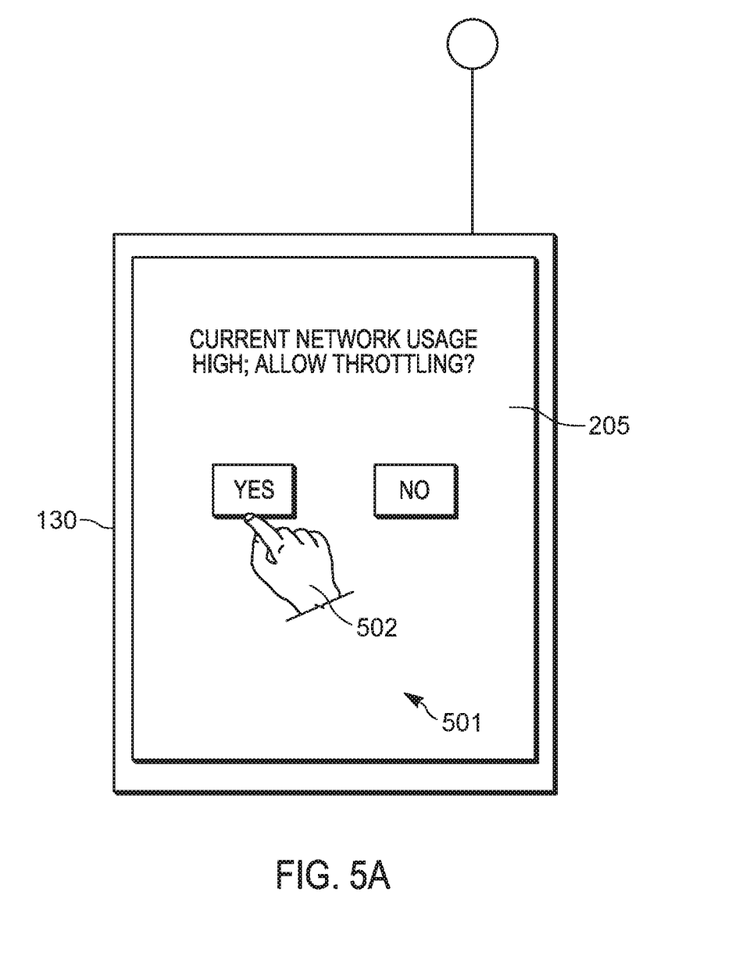
FIG. 5A depicts a perspective view of a mobile communication device determining whether a manual override condition exists when implementing a method for throttling network usage in accordance with some examples.

For example (as best seen in FIG. 5A), the controller 220 may control the display device 205 to provide a graphical user interface (GUI) indicating whether the network usage at the device 130 should be dynamically throttled or not (e.g. due to the current high network usage at the site 120 the device 130 is using to communicate with the network 110). The controller 220 may hence be further configured to: receive, via the input device 206, input for overriding dynamic throttling of the usage of the communication unit 202 by the one or more applications 250 according to the network data (e.g. received at the block 302); and one or more of stop and prevent the dynamic throttling based on the input (e.g. a "YES" decision occurs at the block 308). A person of skill in the art understands that such a manual override may occur when a user of the device 130 is in an emergency situation and any throttling of usage by the applications 250 may negatively impact the emergency.

Alternatively, an override condition may be determined when one or more of the role 291, the priority 292 and the incident type 293 meet given conditions; for example, a given role populated in the role 291 at the memory 222 may be associated with an override condition (e.g. a rank value, over a given rank value, in a hierarchy of rank values, and the like) and/or a given priority populated in the priority 292 at the memory 222 may be associated with an override condition (e.g. a priority value, over a given priority value, in a hierarchy of priority values, and the like; for example, the priority "HIGH" may comprise an override condition).

Alternatively, an override condition may be determined when one or more of the incident type 293 stored in the memory 222 is of a given incident type. For example, an incident type corresponding to misdemeanors (e.g. shoplifting, and the like), may not correspond to an override condition, whereas an incident type corresponding to major crimes (e.g. a "Robbery in Progress", a "Terrorist Attack" and the like) may correspond to an override condition.

When a "YES" decision occurs at the block 308, the controller 220 again implements the block 302, for example, to wait for updated network data from the site 120.

However, when a "NO" decision occurs at the block 308, at a block 311, the controller 220 dynamically throttles usage of the communication unit 202 by the one or more applications 250 according to the network data received at the block 302, for example by applying a profile 251 corresponding to "Profile 1" to each associated application 250.

Figure 5B:
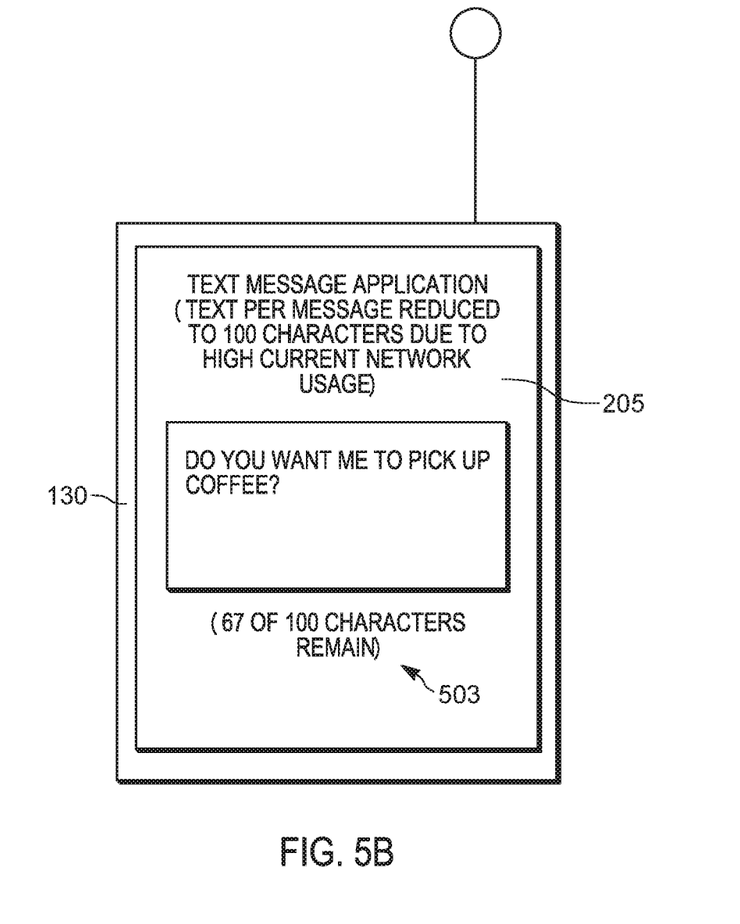
FIG. 5B depicts a perspective view of the mobile communication device of FIG. 5B when implementing the method for throttling network usage at a text message application in accordance with some examples Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

In particular, the controller 220 may be further configured to dynamically throttle usage of the communication unit 202 by the one or more applications 250 according to the network data by one or more of:

Restricting a length of messages; for example, text messages of a text message application 250 may be reduced to a given number of characters, from a default number of characters. For example, a text message application 250 operating in default mode may restrict a number of characters in a text message to 140 characters; when the controller 220 dynamically throttle usage of the communication unit 202 by the text message application 250, a number of characters in a text message may be reduced to 100 characters or fewer, and/or any suitable number of characters. In these examples, a GUI for the text message application 250 may indicate a limit of characters. An example of such throttling is best seen in FIG. 5B described below.

Restricting a pace of transmitting the messages; for example, the device 130 may be restricted to transmitting one text message, of the text message application 250, per minute, and the like, which may represent a reduction over default text message pace.

Reducing a location information transmission rate; for example, a location transmission application 250 may be reduced to transmitting a location of the device 130 to a location server once per minute, and the like, which may represent a reduction over a default location information transmission rate.

Reducing a location information cadence; for example, location transmission application 250 may be reduced. In particular, determining a location of the device 130 using the network 110 (e.g. via triangulation) may be once per minute, and/or location information transmission could be triggered by a moving distance of the device 102 and a sensitivity of the moving distance could be increased, and the like, which may represent a reduction over a default location information cadence.

Reducing a location information payload size; for example, data in the location information may be reduced from latitude, longitude, altitude, speed, direction, etc. to a subset thereof (e.g. only latitude, longitude), and/or a reduction in accuracy of the location information (e.g. one decimal place instead of more than one decimal place) may occur, each of which may represent a reduction over default location information.

Reducing a push-to-talk duration time; for example, a push-to-talk application 250 may be limited to a given talk duration time; a GUI of the push-to-talk application 250 may count down the time left for talking when a push-to-talk key at the device 130 is activated. Such a reduction may represent a reduction in push-to-talk duration time as compared to a default push-to-talk duration time.

Reducing a push-to-talk transmission rate; for example the push-to-talk application 250 may be limited to a given number of push-to-talk transmissions in a minute, which may represent a reduction in push-to-talk transmission rate as compared to a default push-to-talk transmission rate.

Reducing size of multimedia files for transmission; for example, a multimedia transmission application 250 may reduce the resolution of multimedia files to a given resolution, as compared to a default and/or native resolution.

Reducing one or more of an upload rate and a download rate for one or more of the multimedia files; for example, the multimedia transmission application 250 may restricted to a given upload rate and/or a given download rate, which may represent a reduction as compared to a default upload rate and/or a default download rate.

A person of skill in the art understands that each of the reductions in the dynamically throttling of usage of the communication unit 202 by the one or more applications 250, described above, comprises a reduction in usage of the communication unit 202 by the one or more applications 250 as compared to when the device 130 is operating in a default mode, as described in further detail below.

In some examples, the role and/or priority and/or incident type and/or other conditions determined at the block 304 may be used to further determine usage of the communication unit 202 and/or throttling of the communication unit 202. For example, when the role 291 and/or the priority 292 and/or the incident type 293 is not associated with an override condition (e.g. a "NO" decision occurs at the block 308), the role 291 and/or the priority 292 and/or the incident type 293 may be used to further determine how usage of the communication unit 202 is to be dynamically throttled. For example, a priority of "Low" indicated in the priority 292, may have fewer characters available for use in a text message than a priority of "Medium" indicated in the priority 292. In particular, a priority 292 of "Low" may cause the dynamic throttling to occur according to a default dynamic throttling as indicated in the profiles 251 of "Profile 1", whereas a priority 292 of "Medium" may at least partially override the default dynamic throttling as indicated in the profiles 251 of "Profile 1". In one example, a priority 292 of "Medium" may cause the number of characters available in a text message to be increased by a given factor (e.g. 10%) over the number of characters in a text message available when the priority 292 is "Low". Indeed, indicators stored in the priority 292 may be hierarchical and the dynamic throttling adjusted according to a position of the stored indicator in a hierarchy. Indicators of the role 291 and the incident type 293 may be similarly hierarchical, and the dynamic throttling adjusted accordingly.

Hence, in these examples, the controller 220 may be optionally further configured to: determine one or more of a role, a priority and an incident type associated with the mobile communication device 130 (e.g. at the block 304); and one or more of: dynamically throttle usage of the communication unit 202 by the one or more applications 250 according to the network data and one or more of the role, the priority and the incident type; and at least partially override dynamic throttling of the usage of the communication unit 202 by the one or more applications 250 based on one or more of the role, the priority and the incident type.

Returning to the block 306, when the controller 220 determines that the network data received at the block 302 meets a threshold condition 252 corresponding to "Thresh 2" (e.g. normal network usage and/or the network data comprises "Normal" and/or a "2" decision at the block 306), at a block 312, the controller 220 dynamically applies a "Normal" usage of the communication unit 202 by the one or more applications 250 according to the network data received at the block 302, for example by applying a profile 251 corresponding to "Profile 2" to each associated application 250, and optionally adjusts the dynamic usage of the communication unit 202 by the one or more applications based on the role and/or priority and/or incident type and/or other conditions, as determined at the block 304. In some examples, the profile 251 corresponding to "Profile 2" for each associated application 250 may indicate that each associated application 250 is to operate according to a default and/or preprogrammed mode. For example a number of characters in a text message may be restricted to the default number of characters (e.g. 140 characters) however when the priority 292 is "High" the number of characters may be increased by a given amount (e.g. 10%).

Again returning to the block 306, when the controller 220 determines that the network data received at the block 302 meets a threshold condition 252 corresponding to "Thresh 3" (e.g. low network usage and/or the network data comprises "Low" and/or a "3" decision at the block 306), at a block 313, the controller 220 dynamically applies a "High" usage of the communication unit 202 by the one or more applications 250 according to the network data received at the block 302, for example by applying a profile 251 corresponding to "Profile 3" to each associated application 250, and optionally adjusts the dynamic usage of the communication unit 202 by the one or more applications based on the role and/or priority and/or incident type and/or other conditions, as determined at the block 304.

In some examples, the profile 251 corresponding to "Profile 3" for each associated application 250 may indicate that each associated application 250 may use the communications unit 202 at a higher rate than in a default and/or preprogrammed mode. Returning to the example of number of characters in a text message, the number of characters in a text message may be increased from 140 characters to 280 characters and/or when the priority 292 is "High" the number of characters may be increased by a given amount (e.g. 10% over 280 characters).

Furthermore, when the method 300 is being implemented at the device 101 as well as one or more of the devices 102, each of the devices 101, 102 implementing the method 300 may introduce different relative delay times at the block 306 such that the blocks 311, 312, 313 are not implemented simultaneously across the devices 101, 102. For example, hysteresis may occur at the block 306 at each of the devices 101, 102 implementing the method 300, so that not of the devices 101, 102 switch modes at the same time, which may cause oscillation behaviors across the devices 101, 102 (e.g. a sudden reduction in network usage due to all the devices 101, 102 implementing the block 311 may cause each device 101, 102 to determine at the block 306 to implement the block 312, which then suddenly increased network usage, and which may hence cause the devices 101, 102 to oscillate between the blocks 311, 312 (and/or the block 313).

While implementing any of the blocks 311, 312, 313, the controller 220 may continue to determine, at a block 315, whether one or more of a role, priority, incident type and/or any other conditions described above with respect to the block 304 change. When a change occurs (e.g. the priority 292 changes from "Low" to "High" and/or an incident type changes from a misdemeanor to a major crime) and a "YES" decision occurs at the block 315, at a block 317 the controller 220 updates usage of the communication unit 202 by the one more or applications 250. Such an update may include changing a profile 251 applied to an application 250 and/or such an update may include reducing or increasing usage of the communication unit 202 by the one more or applications 250 based on the updated role 291, priority 292, incident type 293, and the like, as described above.

When no change is determined at the block 315 (e.g. a "NO" decision) and/or after updating usage of the communication unit 202 by the one more or applications 250 at the block 317, the controller 220 returns to the block 302 to monitor receipt of network data indicative of current network usage, and the method 300 continues to be implemented.

Indeed, a person of skill in the art now understands that the profiles 251 corresponding to "Profile 1" may alternatively be referred to as throttling profiles associated with respective threshold conditions 252 associated with high network usage (e.g. the threshold conditions 252 corresponding to "Thresh 1").

Indeed, in further examples, the memory 222 may not store profiles 251 corresponding to normal or low network usage (e.g. the profiles 251 corresponding to "Profile 2" and "Profile 3"), nor associated threshold conditions 252, but may store only a throttling profile 251 and/or throttling profiles 251 that are implemented when the network data received at the block 302 meet one or more threshold conditions 252 associated with high network usage. In these examples, the method 300 may comprise the blocks 302, 306 and 311 (e.g. without the blocks 304, 308, 312, 313, 315, 317). However in these examples, at the block 306, the controller 220 determines when the network data meets the one or more threshold conditions 252 associated with high network usage (e.g. the threshold conditions 252 corresponding to "Thresh 1") and, responsively implements the block 311; when the network data does not meet the one or more threshold conditions 252 associated with high network usage at the block 306, the controller continues to implement the block 302. When the block 311 is implemented, the controller 220 continues to throttle the usage of the communication unit 202 until updated network data is received that does not meet the one or more threshold conditions 252 associated with high network usage.

In yet further examples, the controller 220 receives, via the communication unit 202, network data indicative of current network usage (e.g. at the block 302); and dynamically throttles usage of the communication unit 202 by the one or more applications 250 according to the network data (e.g. at the block 311) without using profiles and/or thresholds. Rather, the dynamic throttling may occur according to the network data, for example on a sliding scale and the like.

Regardless, as described above, in some examples, the memory 222 may store application profiles 251 defining behavior of the one or more applications 250 according to the network data, the application profiles 251 comprising at least: a throttling profile (e.g. the profiles 251 corresponding to "Profile 1") defining throttling of the one or more applications 250 when the network data meets one or more threshold conditions associated with high network usage (e.g. the threshold conditions 252 corresponding to "Thresh 1"); in these examples, the controller 220 may be further configured to: select the throttling profile when the network data meets the one or more threshold conditions associated with the throttling profile; and dynamically throttle usage of the communication unit 202 by the one or more applications 250 according to the throttling profile. Also as described above, the application profiles 251 may further comprise; one or more further profiles 251 (e.g. the profiles 251 corresponding to "Profile 2" and "Profile 3") defining behavior of the one or more applications 250 when the network data meets one or more respective second threshold conditions (e.g. the threshold conditions 252 corresponding to "Thresh 2" and "Thresh 3") different from the one or more threshold conditions associated with high network usage; in these examples, the controller 220 is further configured to: select a profile 251, of the one or more further profiles 251, when the network data meets a respective second threshold condition 252 of the one or more respective second threshold conditions; and dynamically control usage of the communication unit 202 by the one or more applications 250 according to the profile 251 selected from the one or more further profiles 251. Indeed, these example are similar to as described above with respect to the method 300 depicted in FIG. 3.

While the method 300 has been described with respect to one throttling profile per application 250, in other examples, the memory 222 may further store one or more respective throttling profiles for each of the one or more applications 250, each of the one or more respective throttling profiles associated with a different respective threshold condition, and the controller may be further configured to: select a respective throttling profile, of the one or more respective throttling profiles, for an associated application 250 when the network data meets a respective threshold condition associated with the respective throttling profile; and dynamically control usage of the communication unit 202 by the associated application 250 according to the respective throttling profile. For example, while the method 300 was described with respect to three profiles 251 per application 250 (and respective threshold conditions 252), where only one of the profiles 251 per application 250 is a throttling profile, one or more of the applications 250 may be stored with more than one throttling profile associated with different threshold conditions. Hence, for example, higher throttling may occur when the network data indicates that current network usage is "Very High" than when the network data indicates that current network usage is "High" (e.g. lower than when "Very High"). The selection of a throttling profile in these examples occurs similar to selecting a profile 251 at the block 306 of the method 300. Indeed, any suitable number of profiles 251 may be stored at the memory 222 with associated threshold conditions 252. For example, while throttling has been described as being modified with respect to roles and/or priorities and/or incident types, the memory 222 may further store different profiles 251 for different combinations of threshold conditions 252 and one or more of roles and/or priorities and/or incident types; hence, as a role and/or priority and/or incident type changes, a different profile 251 is selected to dynamically throttle usage of the communication unit 202.

In yet further examples, a respective priority may be associated with one or more of the plurality of applications 250, for example as stored at the memory 222. Indeed, with brief reference to FIG. 2, the application 250-1 is stored with an indicator 254 indicating a higher priority than the other applications 250-2, 250-M. In an example, a push-to-talk application 250 may be stored with the indicator 254 indicating a higher priority than a multimedia transmission application 250, as emergency personnel may need to access the push-to-talk application 250 on an urgent basis, whereas multimedia transmission may occur on a non-urgent basis. In some of these examples, the controller 220 may be further configured to: prioritize one or more of the plurality of applications 250 when dynamically throttling usage of the communication unit 202 by the one or more applications 250 according to the network data (e.g. at the block 311). For example, the multimedia transmission application 250 may be throttled and the push-to-talk application 250 may not be throttled and/or the push-to-talk application 250 may be throttled to a lesser extent than the multimedia transmission application 250. Such throttling may be defined by the respective throttling profiles 251 associated with high network usage; however, when one throttling profile 251 is common to all the applications 250, the priority of each application 250 may be used to determine a degree of throttling for each application 250.

As person of skill in the art now understands that while the method 300 may be implemented with a plurality of applications 250, a plurality of profiles 251 and a plurality of threshold conditions 252, however the method 300 may be implemented with as few as one application 250 and no profiles 251 and/or threshold conditions 252.

Figure 4:
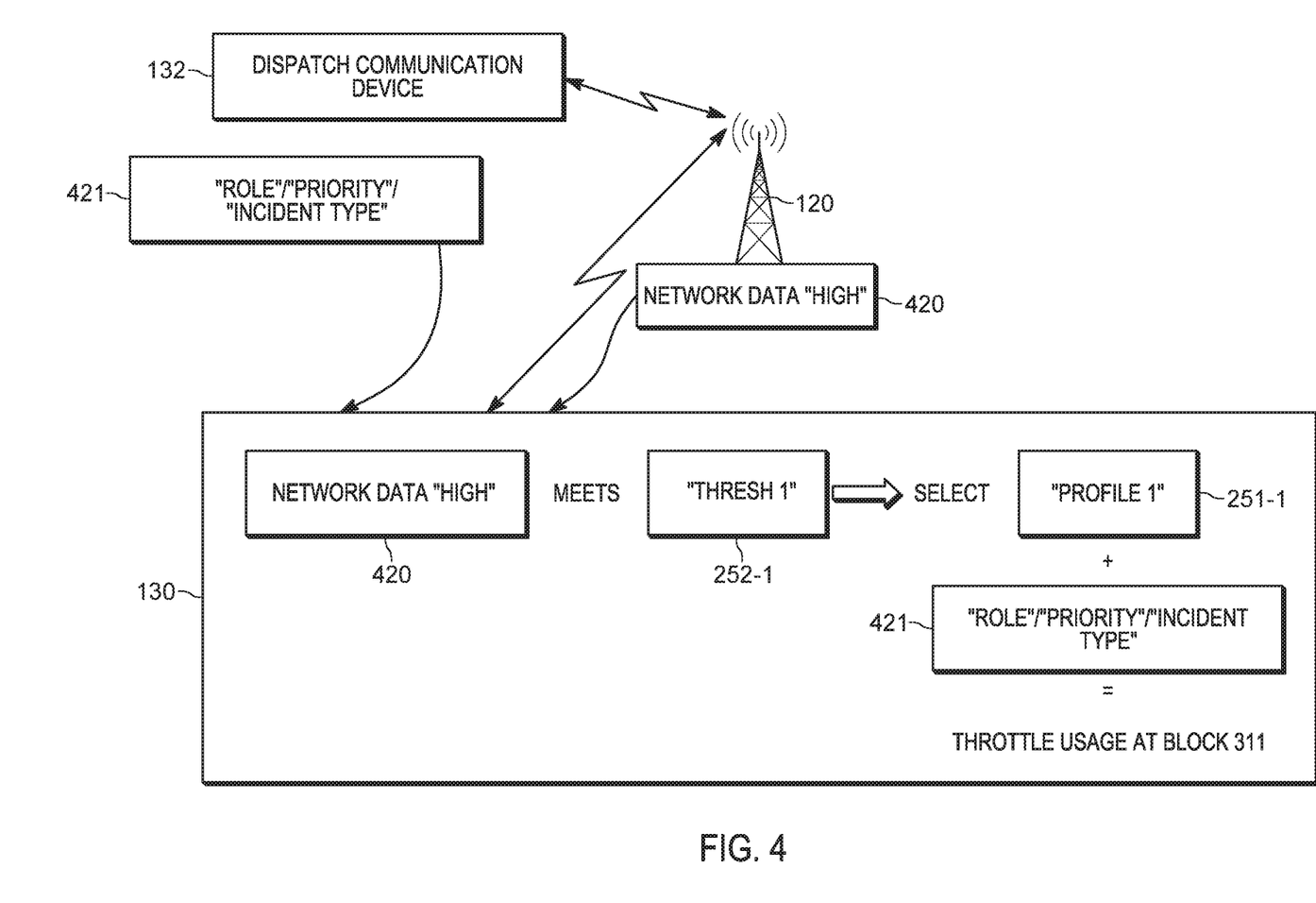
FIG. 4 depicts a portion of the system of FIG. 1 when a method for throttling network usage of a mobile communication device is implemented in accordance with some examples.

Attention is next directed to FIG. 4, FIG. 5A and FIG. 5B which provides an example of the method 300, again using reduction of text characters in a text message application as an example. Hence, the following example will be described with respect to the application 250-1 comprising a text message application, and the associated profile 251-1 comprising a number of characters to which text messages are reduced to using when the threshold condition 252-1 is met.

In particular, FIG. 4 depicts the device 130 and the dispatch communication device 132 in communication using the site 120. While the remaining components of the system 100 are not depicted, they may nonetheless be present. Similarly, while components of the device 130 are not depicted, a person of skill in the art understands that they are present. As depicted, the site 120 has generated network data 420 indicating that the current network usage is "High", and transmits the network data 420 to the device 130, which receives the network data 420 (e.g. at the block 302 of the method 300). While optional, as depicted, the dispatch communication device 132 transmits one or more of a role, a priority and an incident type (e.g. to which the device 130 is currently assigned) to the device 130 as data 421, which receives the data 421 (e.g. at the block 304 of the method 300).

As depicted, the device 130 compares the network data 420 to the threshold conditions 252 and determines (e.g. at the block 306 of the method 300) that the network data 420 meets a threshold condition 252-1 corresponding to "Thresh 1". Hence, the device 130 selects the corresponding profile 251-1 and optionally modifies the profile 251-1 based on the data 421 (e.g. after determining whether an override condition exists at the block 308 of the method 300). At the block 311 the device 130 throttles usage of the communication unit 202 by the corresponding application 250-1.

Attention is next directed to FIG. 5A and FIG. 5B which depicts two perspective views of the device 130 while implementing the method 300 in the example of FIG. 4. In FIG. 5A, the device 130 renders a GUI 501 at the display device 205 (e.g. at the block 308 of the method 300) to determine whether a user of the device 130 wishes to manually override dynamic throttling, for example by presenting selectable options for allowing dynamic throttling (e.g. "YES") or overriding and/or not allowing dynamic throttling (e.g. "NO"). As depicted, a hand 502 of a user selects the option "YES" (e.g. the display device 205 comprises a touch screen device).

Hence, as depicted at FIG. 5B, when a text messaging application (e.g. the application 250-1) is implemented at the device 130 as a GUI 503, the number of characters available to send in a text message is reduced to 100 characters. In the depicted example, the GUI 503 provides both an indication of the number of characters available, as well as the reduction (e.g. "(Text Per Message Reduced to 100 Characters Due To High Current Network Usage"), and provides an indication of a number of available remaining characters (e.g. "67 of 100 Characters Remain").

While the method 300 is described in FIG. 4, FIG. 5A and FIG. 5B with respect to a throttling network usage of the communication unit 202 a text message application, the method 300 may be use used to throttle usage of the communication unit 202 of any of the applications 250.

Hence, provided herein is a device, system and method for throttling network usage of a mobile communication device based on network data, for example as received from a site. As the throttling of the network usage occurs at the mobile communication devices, and as the throttling may increase the network becomes busier and/or as capacity of the network is reduces (e.g. as indicated in the network data transmitted to the mobile communication device) complexity of site planning and/or expansion may be reduced as the mobile communication devices self-throttle based on current network usage. Hence, as traffic at a site increases, each of the mobile communication devices using the site may correspondingly reduce network usage which may result in more headroom and/or overhead capacity for roaming devices.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A mobile communication device comprising:
a communication unit configured to wirelessly communicate over a network;
a memory storing: one or more applications that use the communication unit to communicate via the network; and application profiles defining behavior of the one or more applications according to network data indicative of current network usage at a site with which the communication unit is using to communicate with the network, the application profiles comprising at least: a throttling profile defining throttling of the one or more applications when the network data meets one or more threshold conditions associated with high network usage at the site; and
a controller communicatively coupled to the communication unit and the memory, the controller configured to:
receive, via the communication unit, the network data indicative of the current network usage at the site with which the communication unit is using to communicate with the network;
select the throttling profile when the network data meets the one or more threshold conditions; and
dynamically throttle usage of the communication unit by the one or more applications according to the throttling profile.

2. The mobile communication device of claim 1, wherein the application profiles further comprise; one or more further profiles defining behavior of the one or more applications when the network data meets one or more respective second threshold conditions different from the one or more threshold conditions associated with high network usage, and
the controller is further configured to:
select a profile, of the one or more further profiles, when the network data meets a respective second threshold condition of the one or more respective second threshold conditions; and
dynamically control usage of the communication unit by the one or more applications according to the profile.

3. The mobile communication device of claim 1, wherein the memory further stores one or more respective throttling profiles for each of the one or more applications, each of the one or more respective throttling profiles associated with a different respective threshold condition, and
the controller is further configured to:
select a respective throttling profile, of the one or more respective throttling profiles, for an associated application when the network data meets a respective threshold condition associated with the respective throttling profile; and
dynamically control usage of the communication unit by the associated application according to the respective throttling profile.

4. The mobile communication device of claim 1, wherein the network data indicative of current network usage comprises one or more of:
a number of active mobile devices using the site with which the communication unit is using to communicate with the network;
a number of active talkgroups at the site;
site operation statistics;
channel capacity of the site;
data capacity of the site;
voice capacity of the site;
grade-of-service of the site; and
load indicators of the site.

5. The mobile communication device of claim 1, wherein the controller is further configured to dynamically throttle usage of the communication unit by the one or more applications according to the network data by one or more of:
restricting a length of messages;
restricting a pace of transmitting the messages;
reducing a location information transmission rate;
reducing a location information cadence;
reducing a location information payload size;
reducing a push-to-talk duration time;
reducing a push-to-talk transmission rate;
reducing size of multimedia files for transmission; and
reducing one or more of an upload rate and a download rate for one or more of the multimedia files.

6. The mobile communication device of claim 1, wherein the memory stores a plurality of applications that use the communication unit to communicate via the network, and the controller is further configured to:
prioritize one or more of the plurality of applications when dynamically throttling usage of the communication unit by the one or more applications according to the network data.

7. The mobile communication device of claim 1, wherein the controller is further configured to dynamically control usage of the communication unit based on one or more of:
a role associated with the mobile communication device;
a change in the role associated with the mobile communication device;
a priority associated with the mobile communication device;
a change in the priority associated with the mobile communication device;
an incident type associated with the mobile communication device;
an over-the-air signal quality;
a talkgroup with which the mobile communication device is currently communicating;
a change in the talkgroup with which the mobile communication device is currently communicating; and
the site with which the mobile communication device is currently communicating.

8. The mobile communication device of claim 1, further comprising an input device, and the controller is further configured to:
receive, via the input device, input for overriding dynamic throttling of usage of the communication unit by the one or more applications according to the network data; and
one or more of stop and prevent the dynamic throttling based on the input.

9. The mobile communication device of claim 1, wherein the controller is further configured to:
- determine one or more of a role, a priority and an incident type associated with the mobile communication device; and one or more of:
  - dynamically throttle usage of the communication unit by the one or more applications according to the network data and one or more of the role, the priority and the incident type; and
  - at least partially override dynamic throttling of usage of the communication unit by the one or more applications based on one or more of the role, the priority and the incident type.

10. A method comprising:
- receiving, via a communication unit of a mobile communication device, network data indicative of current network usage at a site with which the communication unit is using to communicate with a network, the communication unit configured to wirelessly communicate over the network, mobile communication device comprising: the communication unit; a controller; and a memory storing: one or more applications that use the communication unit to communicate via the network; and application profiles defining behavior of the one or more applications according to the network data indicative of the current network usage at the site with which the communication unit is using to communicate with the network, the application profiles comprising at least: a throttling profile defining throttling of the one or more applications when the network data meets one or more threshold conditions associated with high network usage at the site;
- select the throttling profile when the network data meets the one or more threshold conditions; and
- dynamically throttling, using the controller of the mobile communication device, usage of the communication unit by one or more applications according to the throttling profile.

11. The method of claim 10, wherein the application profiles further comprise; one or more further profiles defining behavior of the one or more applications when the network data meets one or more respective second threshold conditions different from the one or more threshold conditions associated with high network usage, and
the method further comprises:
- selecting a profile, of the one or more further profiles, when the network data meets a respective second threshold condition of the one or more respective second threshold conditions; and
- dynamically controlling usage of the communication unit by the one or more applications according to the profile.

12. The method of claim 10, wherein the memory further stores one or more respective throttling profiles for each of the one or more applications, each of the one or more respective throttling profiles associated with a different respective threshold condition, and
the method further comprises:
- selecting a respective throttling profile, of the one or more respective throttling profiles, for an associated application when the network data meets a respective threshold condition associated with the respective throttling profile; and
- dynamically controlling usage of the communication unit by the associated application according to the respective throttling profile.

13. The method of claim 10, wherein the network data indicative of current network usage comprises one or more of:
- a number of active mobile devices using the site with which the communication unit is using to communicate with the network;
- a number of active talkgroups at the site;
- site operation statistics;
- channel capacity of the site;
- data capacity of the site;
- voice capacity of the site;
- grade-of-service of the site; and
- load indicators of the site.

14. The method of claim 10, further comprising dynamically throttling usage of the communication unit by the one or more applications according to the network data by one or more of:
- restricting a length of messages;
- restricting a pace of transmitting the messages;
- reducing a location information transmission rate;
- reducing a location information cadence;
- reducing a location information payload size;
- reducing a push-to-talk duration time;
- reducing a push-to-talk transmission rate;
- reducing size of multimedia files for transmission; and
- reducing one or more of an upload rate and a download rate for one or more of the multimedia files.

15. The method of claim 10, wherein the memory stores a plurality of applications that use the communication unit to communicate via the network, and the method further comprises:
- prioritizing one or more of the plurality of applications when dynamically throttling usage of the communication unit by the one or more applications according to the network data.

16. The method of claim 10, further comprising dynamically controlling usage of the communication unit based on one or more of:
- a role associated with the mobile communication device;
- a change in the role associated with the mobile communication device;
- a priority associated with the mobile communication device;
- a change in the priority associated with the mobile communication device;
- an incident type associated with the mobile communication device;
- an over-the-air signal quality;
- a talkgroup with which the mobile communication device is currently communicating;
- a change in the talkgroup with which the mobile communication device is currently communicating; and
- the site with which the mobile communication device is currently communicating.

17. The method of claim 10, further comprising:
- receiving, via an input device, input for overriding dynamic throttling of usage of the communication unit by the one or more applications according to the network data; and
- one or more of stopping and preventing the dynamic throttling based on the input.

18. The method of claim 10, further comprising:
- determining one or more of a role, a priority and an incident type associated with the mobile communication device; and one or more of:
  - dynamically throttling usage of the communication unit by the one or more applications according to the network data and one or more of the role, the priority and the incident type; and
at least partially overriding dynamic throttling of usage of the communication unit by the one or more applications based on one or more of the role, the priority and the incident type.

* * * * *